United States Patent
Kohno et al.

(10) Patent No.: US 9,506,971 B2
(45) Date of Patent: Nov. 29, 2016

(54) FAILURE DIAGNOSIS METHOD FOR PHOTOVOLTAIC POWER GENERATION SYSTEM

(71) Applicant: Hitachi, Ltd., Chiyoda-ku, Tokyo (JP)

(72) Inventors: Tohru Kohno, Tokyo (JP); Akihiro Nakamura, Tokyo (JP); Tomoharu Nakamura, Tokyo (JP); Koki Morikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 624 days.

(21) Appl. No.: 13/975,826

(22) Filed: Aug. 26, 2013

(65) Prior Publication Data

US 2014/0058688 A1 Feb. 27, 2014

(30) Foreign Application Priority Data

Aug. 27, 2012 (JP) ................ 2012-186501

(51) Int. Cl.
 *G01R 31/00* (2006.01)
 *G01R 31/02* (2006.01)
 *H02S 50/10* (2014.01)

(52) U.S. Cl.
 CPC ............ *G01R 31/02* (2013.01); *H02S 50/10* (2014.12)

(58) Field of Classification Search
 CPC .... G05F 1/67; Y10S 320/13; Y10S 323/906; Y10T 307/516
 See application file for complete search history.

(56) References Cited

U.S. PATENT DOCUMENTS

| 4,977,744 | A | * | 12/1990 | Lenz | F03G 6/065 60/641.15 |
|---|---|---|---|---|---|
| 5,684,385 | A | * | 11/1997 | Guyonneau | G05F 1/67 136/293 |
| 6,657,419 | B2 | * | 12/2003 | Renyolds | H02J 7/35 323/285 |
| 2012/0247542 | A1 | | 10/2012 | Ammer et al. | |
| 2012/0303298 | A1 | | 11/2012 | Nakai et al. | |
| 2012/0323507 | A1 | | 12/2012 | Hasegawa et al. | |
| 2013/0300449 | A1 | | 11/2013 | Nakamura et al. | |
| 2013/0311121 | A1 | | 11/2013 | Kohno et al. | |

FOREIGN PATENT DOCUMENTS

| JP | 2005-340464 A | 12/2005 |
|---|---|---|
| JP | 2006-278711 A | 10/2006 |
| JP | 2010-123880 A | 6/2010 |
| JP | 2011-181614 A | 9/2011 |
| JP | 2011-216811 A | 10/2011 |
| JP | 2012-156343 A | 8/2012 |

(Continued)

OTHER PUBLICATIONS

Japanese-language Office Action issued in counterpart Japanese Application No. 2012-186501 dated Apr. 8, 2016 with English translation (Four (4) pages).

*Primary Examiner* — Elias Desta
(74) *Attorney, Agent, or Firm* — Crowell & Moring LLP

(57) ABSTRACT

A low-cost failure diagnosis method, without addition of a measuring unit and a communication unit, provided for a solar battery system, of calculating a working temperature and the number of failed solar battery modules in a solar battery array, by calculating a solar radiation amount while updating a predetermined coefficient as a ratio between a short-circuit current and a working current in accordance with state of the solar battery array and using measured data having the working current and working voltage measured with a detection unit.

15 Claims, 18 Drawing Sheets

(56) References Cited

FOREIGN PATENT DOCUMENTS

| JP | 2012-160498 A | 8/2012 |
| WO | WO 2011/041819 A2 | 4/2011 |
| WO | WO 2011/089999 A1 | 7/2011 |

* cited by examiner

FAILURE DIAGNOSIS METHOD FOR PHOTOVOLTAIC POWER GENERATION SYSTEM

CLAIM OF PRIORITY

The present application claims priority from Japanese patent application JP2012-186501 filed on Aug. 27, 2012, the content of which is hereby incorporated by reference into this application.

BACKGROUND OF THE INVENTION

The present invention relates to a failure diagnostic technique for conducting diagnosis on a failure in a solar battery module in a photovoltaic power generation system having a large number of solar battery modules.

In a large scale photovoltaic power generation system represented by a mega solar, several thousands to several tens of thousands of 100 to 200 w class solar battery modules are arranged in one power generation site.

In the respective solar battery modules, the output with the same solar radiation amount and on the same temperature condition is gradually reduced due to aged deterioration. In some of the modules, the output is radically reduced due to the quality in manufacturing or physical damage. The state of radically-reduced output is referred to as a failure.

As a method for detecting a failure in a solar battery module, a visual inspection, a heat generation inspection with a thermometer, and an inspection of electric characteristics using a tester are performed. These inspections are performed on each solar battery module. When the number of solar battery modules is increased, the labor and cost required for the inspections are increased.

Regarding this problem, Japanese Published Unexamined Patent Application No. 2010-123880 discloses a method for automatic failure determination of providing a measuring unit and a communication unit by solar battery module, and determining whether or not a failure has occurred in a solar battery by comparing a measurement result transmitted from the communication unit with a threshold value. Further, Japanese Published Unexamined Patent Applications Nos. 2005-340464 and 2011-181614 disclose a method of connecting a measuring unit by a unit of serially-connected solar battery modules, referred to as a string, for the sake of reduction of cost of the measuring unit, for failure determination. Further, from the viewpoint of improvement of inspection accuracy, Japanese Published Unexamined Patent Application No, 2011-216811 discloses a method of using a logical power generation amount calculated based on a solar radiation amount measured with an actinometer.

SUMMARY OF THE INVENTION

By using the above-described conventional techniques, it is possible to solve the problem of labor for measuring each solar battery module. However, since it is necessary to provide the measuring unit and the communication unit by solar battery module or by string, it is not possible to solve the problem of cost.

Regarding the measurement with the measuring unit, reproducible high-accuracy measurement is not realized unless it is performed at a speed of frequency twice higher than a switching frequency used in switching control in the power conditioner (Nyquist frequency). Accordingly, generally, the switching frequency and its higher-order frequency are eliminated with a low-pass filter. However, as the switching frequency in the photovoltaic power generation system is not high, i.e., it is on the order of several kHz, the measurement interval is limited to 10 msec. The measurement is influenced by variation of solar radiation or the like, and accordingly, the measurement accuracy is not improved.

Further, regarding the solar radiation measurement with an actinometer as disclosed in Japanese Published Unexamined Patent Application No. 2011-216811, the measured solar radiation amount does not always correspond with the solar radiation amount distributed in the entire power generation site. Further, the reaction velocity of the actinometer is low. Accordingly, it is impossible to perform high accuracy measurement.

In view of the above-described situation, the present invention provides a failure diagnosis method in a large scale photovoltaic power generation system, to realize high accuracy failure detection without adding an extra measuring unit and a communication unit.

To attain the above-described object, the present invention provides a failure diagnosis method for a photovoltaic power generation system, wherein the photovoltaic power generation system has: a detection unit that detects a working voltage and a working current of a solar battery array, formed by connecting in parallel a plurality of solar battery strings, each formed by serially connecting a plurality of modules, each formed by serially connecting a plurality of solar battery cells and connecting a protective diode to both ends, as one unit; and a failure information calculation unit that calculates failure information using the detected working voltage and the working current, and wherein the failure information calculation unit calculates a solar radiation intensity of radiation on the solar battery array using a predetermined coefficient from the working current, calculates a working temperature of the solar battery array and failure information using the working voltage and the solar radiation intensity, and updates the predetermined coefficient using the calculated working temperature and the failure information.

Further, to attain the above-described object, the present invention provides a failure diagnosis method for a photovoltaic power generation system, wherein the photovoltaic power generation system has: a detection unit that detects a working voltage and a working current of a solar battery array, formed by connecting in parallel a plurality of solar battery strings, each formed by serially connecting a plurality of modules, each formed by serially connecting a plurality of solar battery cells and connecting a protective diode to both ends, as one unit; and a failure information calculation unit that calculates failure information using the detected working voltage and the working current, and wherein the failure information calculation unit calculates a solar radiation intensity of radiation on the solar battery array using a predetermined coefficient from the working current, calculates a working temperature of the solar battery array and failure information using the working voltage and the calculated solar radiation intensity, and updates the predetermined coefficient by comparing a calculated value of electric power based on the working temperature and the solar radiation intensity calculated while a wiring resistance value is decremented in all the solar battery modules, with a measured value of electric power based on the working voltage and the working current.

According to the present invention, in a large scale photovoltaic power generation system, it is possible to grasp failure information of a solar battery module existing in a solar battery array with high accuracy, without adding an extra measuring unit, a communication unit, an actinometer and a thermometer.

DETAILED DESCRIPTION OF THE PREFERRED EMBODIMENTS

Hereinbelow, preferred embodiments of the present invention will now be described in detail in accordance with the accompanying drawings.

First Embodiment

A first embodiment relates to a failure diagnosis method for a photovoltaic power generation system of obtaining solar radiation intensity of radiation on a solar battery array using a predetermined coefficient from a working current of the solar battery array, calculating a working temperature and failure information of the solar battery array using a working voltage and the solar radiation intensity, and updating the predetermined coefficient using the calculated working temperature and the failure information. Prior to the explanation of the present embodiment, the photovoltaic power generation system in a mega solar power generation site to which the embodiments are applied will be described.

Figure 1:
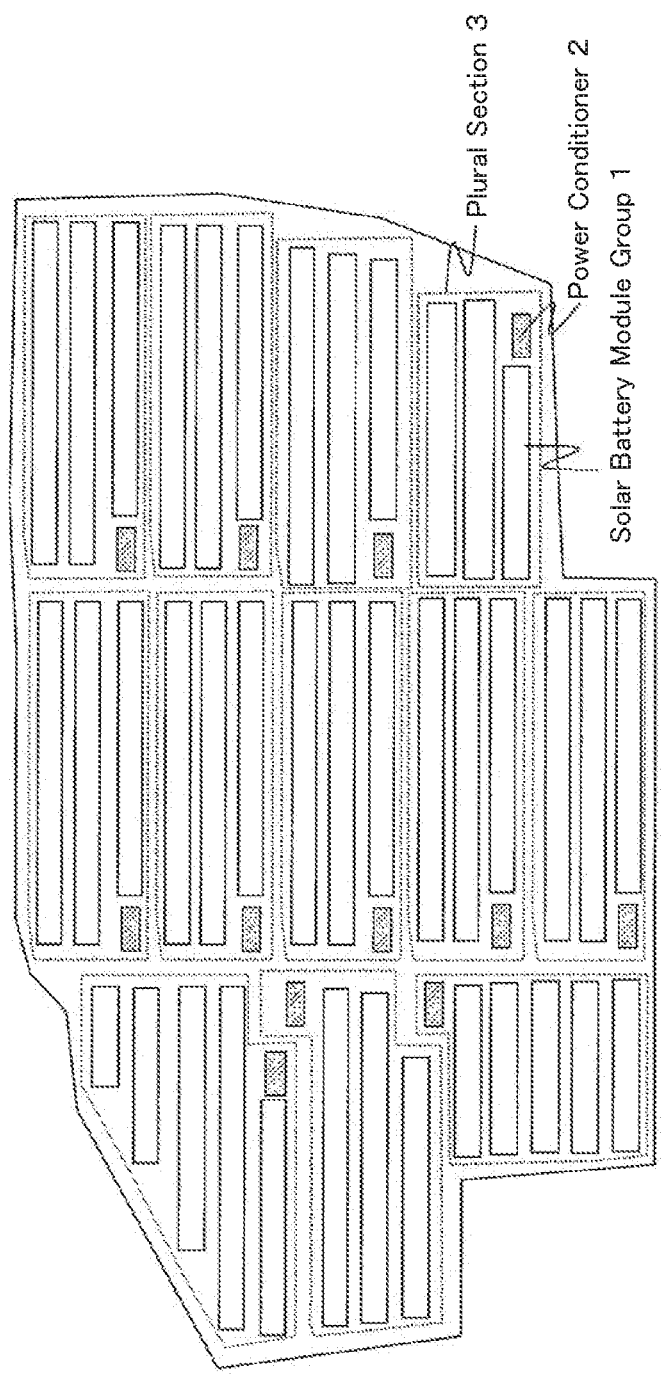
FIG. 1 is a plan view showing an example of the arrangement of a mega solar power generation site according to respective embodiments of the present invention.
Figure 2:
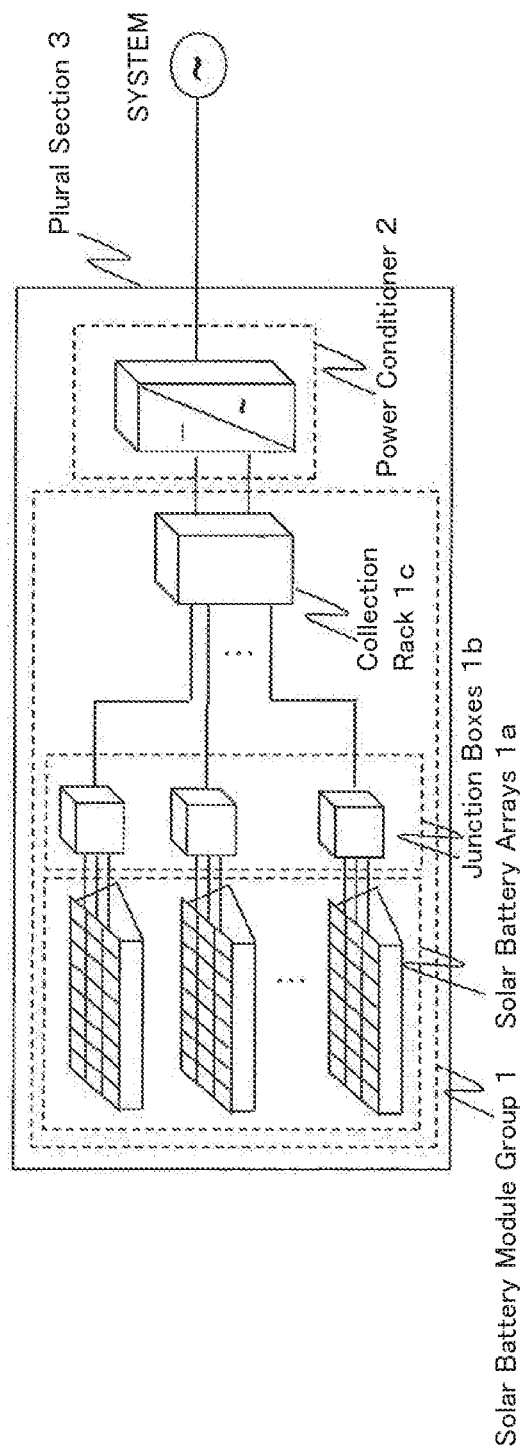
FIG. 2 is a perspective diagram showing an example of the entire configuration of the large scale photovoltaic power generation system according the respective embodiments.

FIG. 1 is a plan view showing an example of the arrangement of a mega solar power generation site. The mega solar power generation site is constituted by arranging plural sections 3 each including plural solar battery module groups 1 and a power conditioner 2. As shown in FIG. 2, the plural solar battery module groups 1 has a configuration where plural solar battery arrays 1a and plural junction boxes 1b are connected to a collection rack 1c. The direct current and direct current voltage concentrated in the collection rack 1c are transmitted to the power conditioner 2, then converted with a converter to an alternating current and is linked to the system.

Figure 3A:
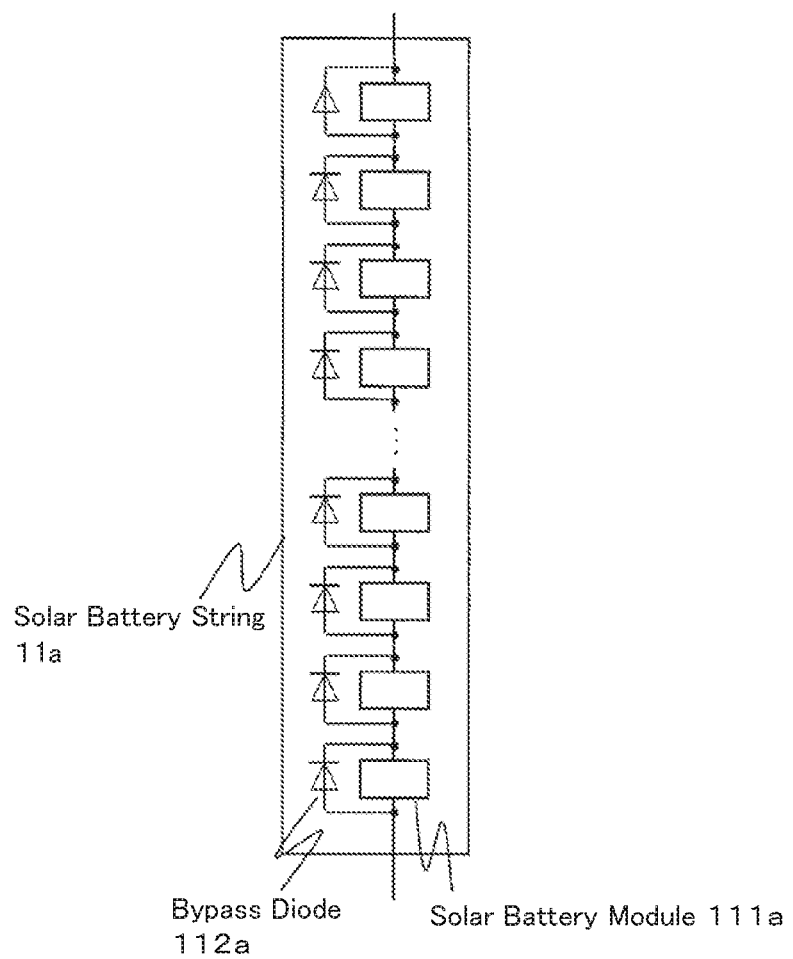
FIG. 3A is a block diagram showing an example of the arrangement a solar battery array and wiring according to the respective embodiments.

As shown in FIG. 3A, a structure where plural solar battery modules 111a are serially arrayed is referred to as a solar battery string 11a. To prevent flow of reverse current upon application of reverse bias, a bypass diode 112a is attached to each solar battery module 111a.

Figure 3B:
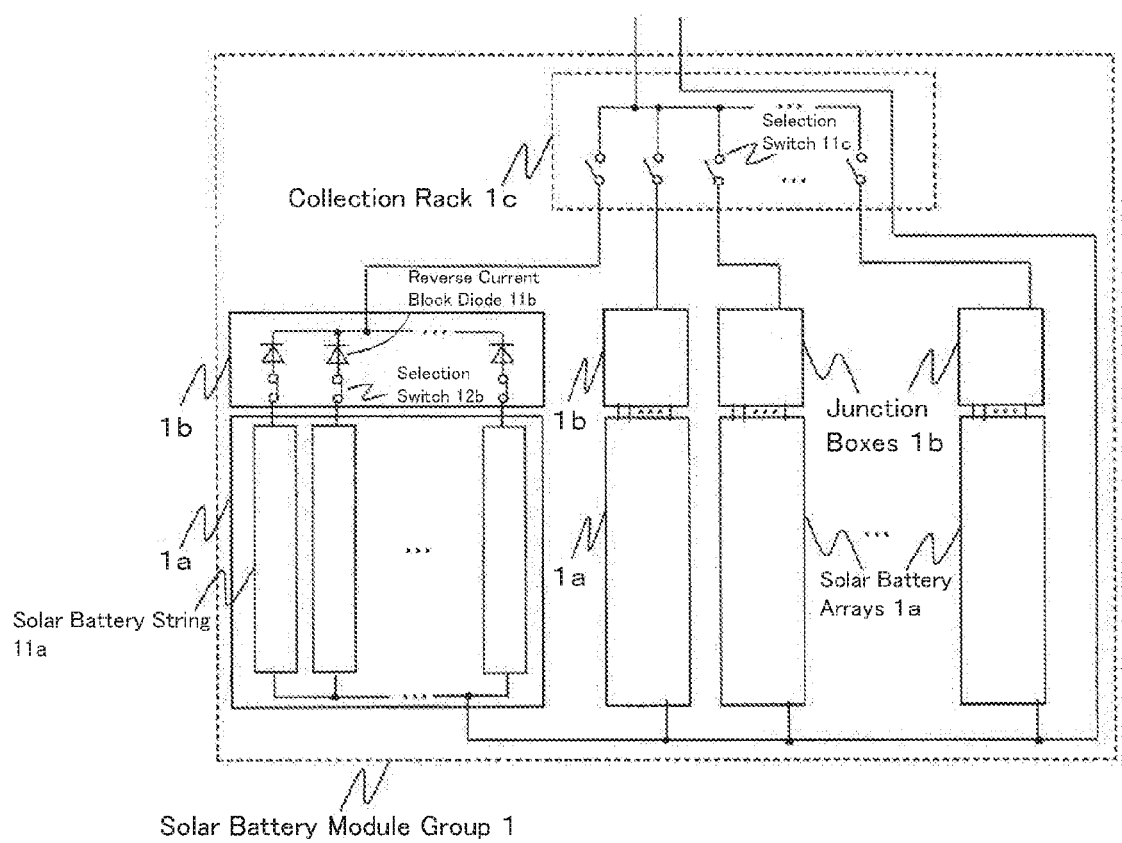
FIG. 3B is a block diagram showing an example of the arrangement of the solar battery array and the wiring.

As shown in FIG. 3B, the solar battery array 1a is constituted by connecting the solar battery strings 11a in parallel in a junction box 1b. A reverse current block diode 11b to prevent reverse current inflow is attached to each string unit. It is also possible to select the current path of each string by selecting a switch 12b. The plural junction boxes are further connected in parallel in the collection rack 1c. With this arrangement, the plural solar battery arrays 1a are connected in parallel. In the collection rack 1c, a switch 11c is provided, and it is possible to select the current path of each array.

Figure 4:
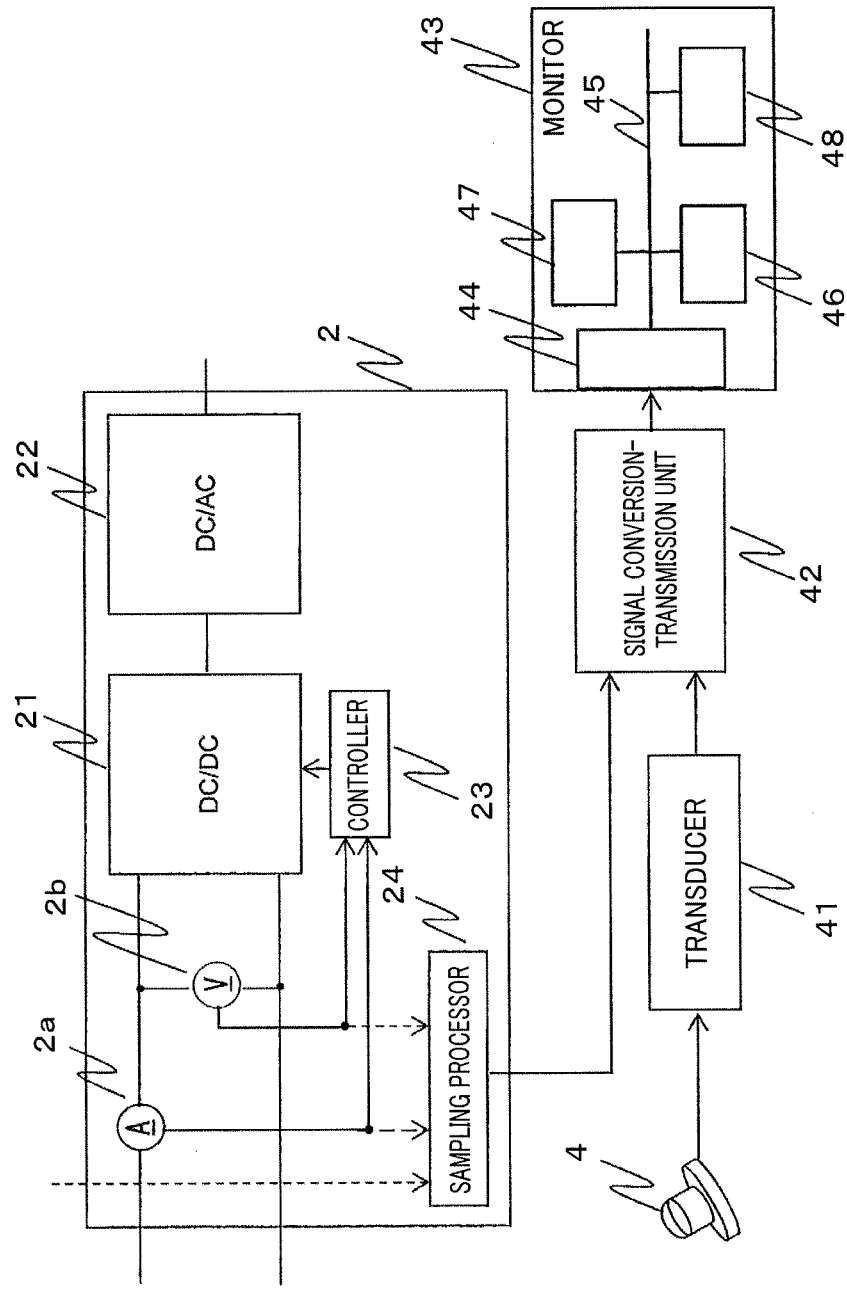
FIG. 4 is a block diagram showing a configuration for monitoring solar battery characteristics using a power conditioner (PCS) in the photovoltaic power generation system according to the respective embodiments.

FIG. 4 is a block diagram explaining the configuration and operation of the power conditioner 2. Control to extract maximum electric power from the plural solar battery arrays 1a connected to the collection rack 1c is referred to as MPPT (Maximum Power Point Tracking) control. This MPPT control is attained by controlling the operation of a DC/DC converter circuit 21 from a controller 23 using direct current power measured with an ammeter 2a and a voltmeter 2b in the power conditioner 2. The DC/DC converter circuit 21 as a direct current boost converter boosts the direct current voltage from the solar battery array and supplies it to an AC/DC inverter 22, thus supplies an alternating current voltage to the outside.

Generally, in a large-scale photovoltaic power generation system, the direct current voltage and the direct current measured during the MPPT control are subjected to sampling processing with a sampling processor 24, then transmitted via a signal conversion-transmission unit 42 to a monitor 43. Regarding reference solar radiation intensity measured with an actinometer 4, i.e., a solar radiation amount (kW/m$^2$) per unit area, it is standardized with a transducer 41 as a weather signal, and transmitted via the signal conversion-transmission unit 42 to the monitor 43.

The monitor 43 has e.g. a general computer structure including an interface 44, an internal bus 45 connected to the interface 44, a memory 46 as a storage connected to the internal bus 45, a central processing unit (CPU) 47 as a processor, and a hard disk drive (HDD) 48 as a storage and the like. The CPU 47 performs monitoring by analyzing data inputted from the signal conversion-transmission unit 42 by executing various programs stored in the memory 46. The analyzed data and the like are accumulated in the HDD 48, or may be transmitted to the outside via a network interface (not shown).

In the sampling processor 24 of the power conditioner 2, the direct current voltage and the direct current measured during the MPPT control are subjected to sampling at an interval double or greater than a switching control frequency (Nyquist frequency), and further, several points of the measured values subjected to the sampling are averaged, thus the measurement accuracy is ensured. For example, when the switching frequency is 4 kHz, sampling is performed by 125 μsec, and 8 points are sampled in 1 msec and averaged. In this case, the measurement error of the measured value reproduced in accordance with the sampling theorem is suppressed to $(1/\sqrt{8})=(1/2.828)$, i.e., high accuracy measurement is realized in a short period.

Figure 5:
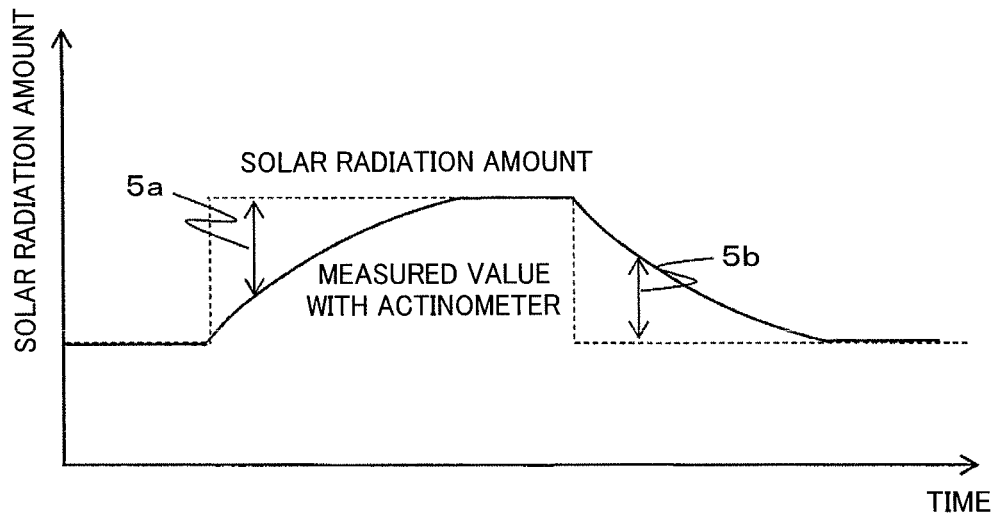
FIG. 5 is a graph showing a reaction velocity of an actinometer according to the respective embodiments.

Regarding the actinometer 4 to measure the solar radiation amount, generally, one actinometer is installed in a power generation site. In the case of a large-scale photovoltaic power generation system, since the system is placed in a land having a wide area as shown in FIG. 1, distributed solar radiation occurs, and the measured solar radiation amount is not always the same as the solar radiation amount by irradiation of a solar battery array of some section. Regarding the measurement interval, generally, as shown in FIG. 5, several seconds of response time is required with respect to the change of solar radiation. The slowness of the response time causes the measurement error 5a or measurement error 5b, and constrains the accuracy of the measurement of solar radiation amount.

As described above, to perform high accuracy measurement to realize failure diagnosis for a large-scale power generation site, it is advantageous to utilize the direct current voltage and the direct current measured with the power conditioner 2 during the MPPT control. Regarding the solar radiation amount, it is advantageous to calculate the solar radiation intensity of radiation on the solar battery array from the measurement value in the power conditioner, and utilize the solar radiation amount measured with the actinometer as reference solar radiation intensity.

Figure 6A:
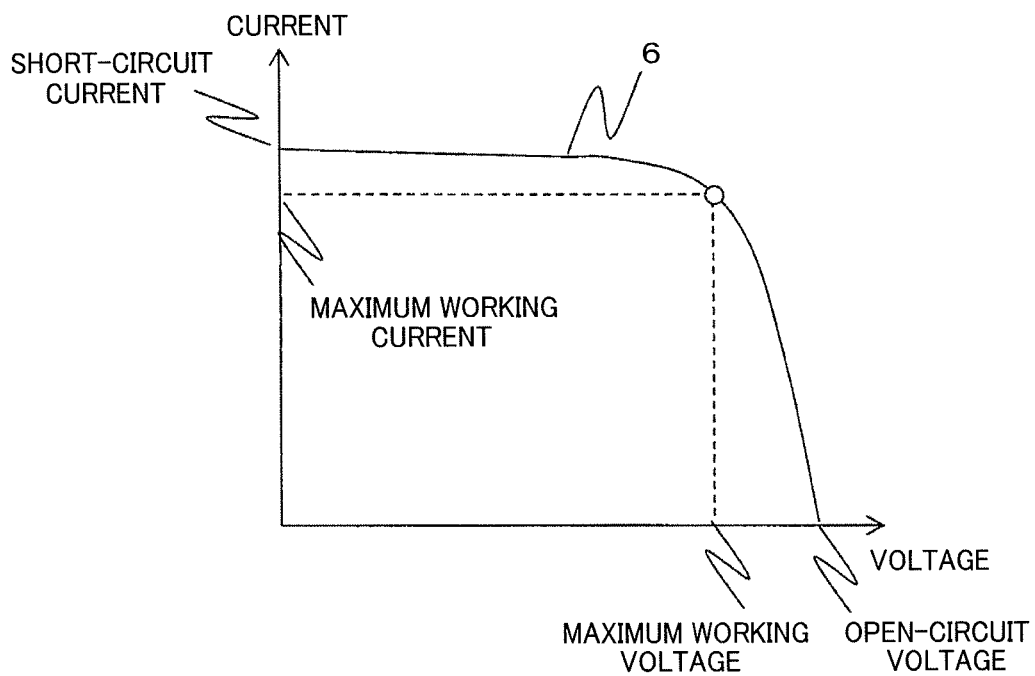
FIG. 6A is a graph explaining the correlation between a short-circuit current and a working current according to the respective embodiments.

Hereinbelow, in the failure diagnosis method for photovoltaic power generation system in the present embodiment, a method for calculating the solar radiation amount per unit area as solar radiation intensity of radiation on the solar battery array, from the measurement value with the power conditioner 2, will be described. The solar battery module has a static characteristic as shown in FIG. 6A. The current when the voltage is 0 i.e. upon short-circuit is referred to as a short-circuit current; the voltage when the current is 0, i.e., upon open-circuit is referred to as an open-circuit voltage; and the current and the voltage at a working point when the maximum power can be extracted are referred to as maximum working current and maximum working voltage.

Figure 6B:
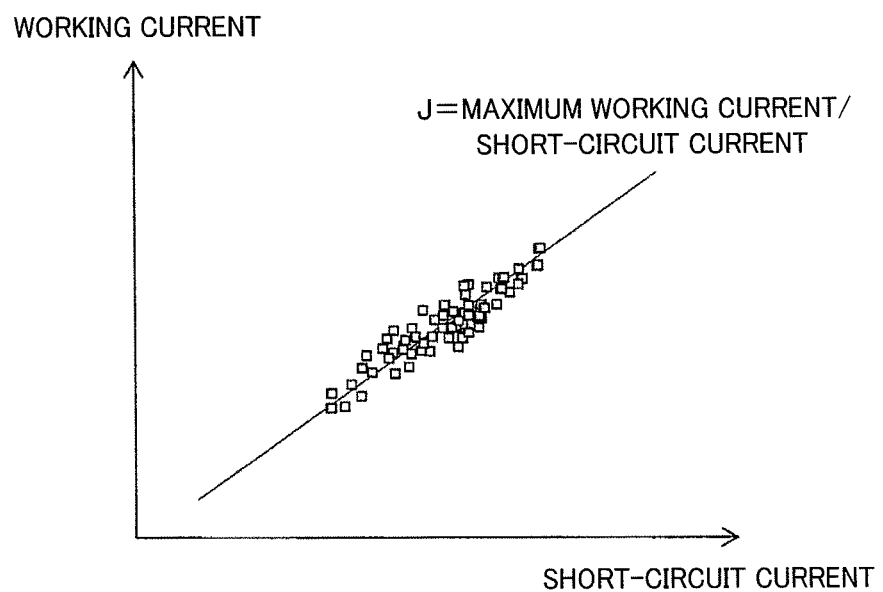
FIG. 6B is a graph explaining the correlation between the short-circuit current and the working current according to the respective embodiments.

As shown in FIG. 6B, from evaluation of several ten-thousands of 100 to 200 w class solar battery modules constituting a large-scale photovoltaic power generation system, regardless of manufacturing variation or type of solar battery module, it is found that the correlation between the working current and the short-circuit current is very high. Further, it is found that a ratio J between the working current and the short-circuit current, determined by solar battery module, is approximately constant within the range of MPPT-controlled radiation amount of 0.1 to 1.0 kW/m2 or operational temperature range. In the present specification, the ratio J between the working current and the short-circuit current may also be referred to as a predetermined coefficient.

Assuming that the measured maximum working current is defined as an Ipmax_b; the short-circuit current and the maximum working current when the solar radiation amount in a standard state is 1.0 kW/m$^2$ at 25° C. are defined as Isc_0 and Ipmax_0; and the working temperature is defined as Tb, the solar radiation amount pb can be calculated with expressions (1) to (3) using a temperature coefficient α of the short-circuit current.

$$J = I p \max\_0 / I s c\_0 \qquad (1)$$

$$I s c\_0 [T b] = I s c\_0 + a \cdot (T b - 25) \qquad (2)$$

$$p b = (I p \max\_b / J) / I s c\_0 [T b] \qquad (3)$$

As shown in FIG. 6B, the ratio J between the working current and the short-circuit current is approximately constant regardless of manufacturing variation or type. However, when failure, degradation or light irradiation effect occurs in the solar battery module 111a, its value is changed.

Next, the case of the occurrence of failure in the solar battery module 111a will be described using FIGS. 7A and 7B. The mechanism of the progress of failure of the solar battery module 111a is as shown in the figures. As shown in (a) of FIG. 7A, the solar battery module is constituted by plural serially-connected solar battery cells 1111a. The cells are connected by soldering. When the solder is peeled, a wiring resistance component 1111b is increased.

Figure 7A:
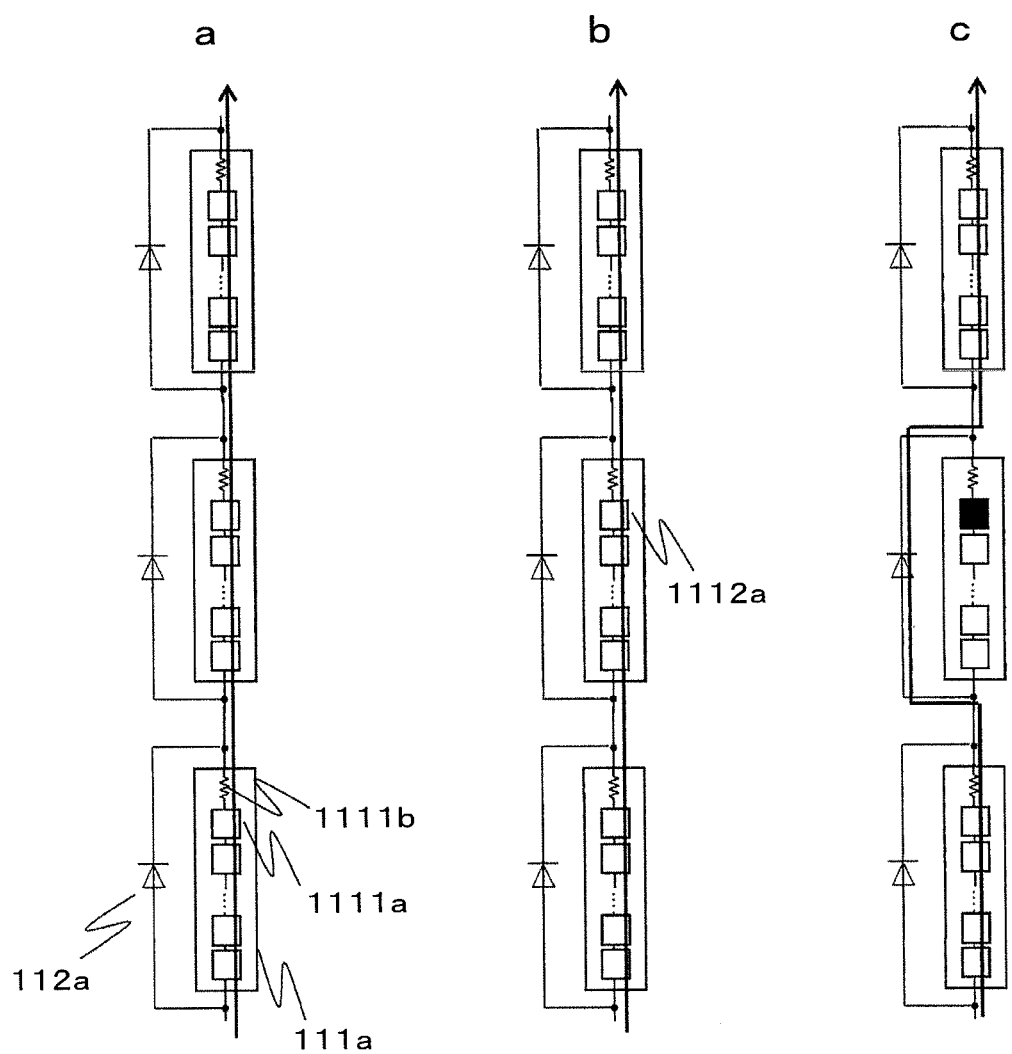
FIG. 7A is a block diagram explaining a current path when a failure occurs in a solar battery module, according to the respective embodiments.

At this time, the normal state as shown in (a) of FIG. 7A changes to a state (b) of FIG. 7A having hot spot 1112a. The "hot spot" is a phenomenon that the temperature of a solder-peeled cell becomes higher in comparison with the peripheral cells. A failure diagnosis method using a thermo camera or the like is used as a general method. Further, when the solder is peeled, the wiring resistance value is further increased, and the current driving performance of the solar battery module having the hot spot 1112a is significantly lowered.

At this time, the bypass diode operates. This state is as shown in (c) of FIG. 7A. Generally this phenomenon is diagnosed by observing heat generation of the junction box having the bypass diode. As shown in (c) of FIG. 7A, when the wiring resistance 1111b of the failed module is increased, the current flows via the bypass diode from some point.

Figure 7B:
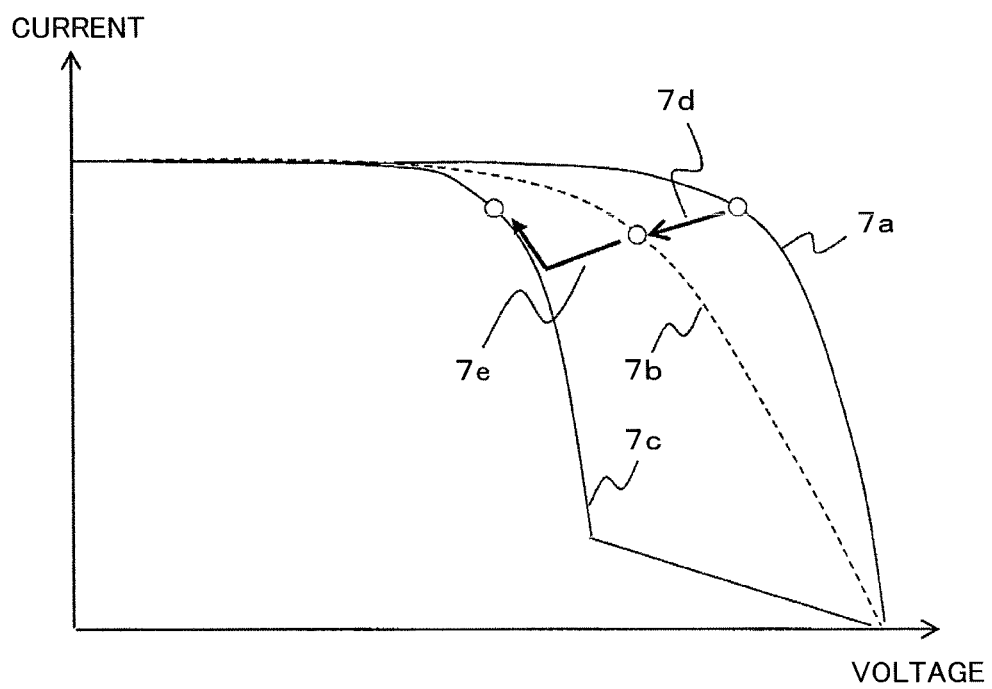
FIG. 7B is a graph explaining a characteristic change when a failure occurs in the solar battery module, according to the respective embodiments.

FIG. 7B shows the change of the solar battery characteristic at this time. The current-voltage characteristic of the solar battery changes from characteristic 7a to 7b in accordance with an increase in the wiring resistance 1111b. Further, when the bypass diode functions, the characteristic changes to characteristic 7c as if the voltage were shifted while the normal state i.e. the maximum working current is maintained. In the progress of change from the characteristic 7a to 7b and to 7c, the maximum electric power point changes as indicated with characteristics 7d and 7e. That is, the ratio J between the working current and the short-circuit current changes until the bypass diode operates, then returns to the initial value when the bypass diode is turned ON.

From the above-described relation, in the failure diagnosis method in the present embodiment, the solar radiation amount of irradiation on the solar battery array is calculated from the measured value with the power conditioner, by automatically updating the ratio J between the working current and the short-circuit current. The failure diagnosis is performed by utilizing the value.

The solar battery module 111a having N cells (Ncell) is represented with expression (4), using parameters I: output current [A], Is: reverse saturation current [A], V: output voltage [V], Isc: short-circuit current [A], T: solar battery element absolute temperature [K], k: Boltzmann's constant [J/K], Rs: wiring resistance [Ω], q: electron electrical charge [C], Rsh: parallel resistance [Ω], nf: junction constant, and p: solar radiation amount [kW/m$^2$].

$$I=Isc \cdot p - Is \cdot \{\exp(q \cdot (V/(Ncell) + Rs \cdot I)/(nf \cdot k \cdot T))\} - (V/(Ncell) + Rs \cdot I)/Rsh \quad (4)$$

Next, the method for calculating the current-voltage characteristic of the solar battery array 1a will be described. In the present specification, this array calculation will be referred to as an array computation. The array computation is realized with a combination of string analysis and array analysis. In string analysis, since the same current flows through the plural modules, the respective solar battery module voltages V[1], V[2], V[3], ... V[N−1] and V[N] when a current I flows are obtained from the expression (4), and the sum Vstring is obtained. The voltage is calculated from the expression (4) with an inverse function, it can be easily obtained by using repetitive operation such as Newton method. When solder peeling or disconnection occurs in a module, the voltage is lowered in comparison with a normal module voltage. In the case of disconnection, as the bypass diode functions, it is considered that module voltage≈0 holds.

In array analysis, since the same voltage is applied to the plural strings, the current extracted from the respective strings I[1], I[2] ... I[N] upon application of voltage V are obtained from the expression (4), and the sum Iarray is obtained. That is, the array computation is computation to obtain the current-voltage characteristic of the solar battery array with the combination of string analysis and array analysis. The maximum working current and the maximum working voltage obtained with the array computation are defined as Vpmax_a and Ipmax_b.

Generally, a thermoelectric couple or the like is used as a temperature sensor, however, its measurement accuracy is low. Accordingly, in the failure diagnosis method of the present embodiment, the working temperature is also calculated only from the maximum working current Ipmax_b and the maximum working voltage Vpmax_b measured with the power conditioner. Using open-circuit voltage temperature coefficient β[V/° C.], assuming that the open-circuit voltage at normal temperature Ta is Voc_a, the open-circuit voltage Voc_b is represented as in the expression (5).

$$Voc\_b = Voc\_a + \beta \cdot (Tb - Ta) \quad (5)$$

Next, using the above-described coefficient J, similarly on the condition that working temperature Tb, $$Ipmax\_b = J \cdot Isc\_b \cdot p \quad (6)$$

Note that Isc_b is a short-circuit current at temperature Tb when the solar radiation amount is 1.0 kW/m$^2$.

The working voltage Vpmax_b and the open-circuit voltage Voc_b are represented with expressions (7) and (8).

$$Vpmax\_b = Ncell \cdot (nf \cdot k \cdot Tb)/q \cdot \ln\{(Isc\_b \cdot pb - Ipmax\_b)/Is\} \quad (7)$$

$$Voc\_b = Ncell \cdot (nf \cdot k \cdot Tb)/q \cdot \ln\{(Isc\_b \cdot pb)/Is\} \quad (8)$$

The expression (7) and the expression (8) are merged as follows.

$$Vpmax\_b - Voc\_b = Ncell \cdot ((nf \cdot k \cdot Tb)/q) \cdot \ln(1-J) \quad (9)$$

Then the expression (5) is substituted.

$$Tb = (Vpmax\_b - Voc\_a - \beta \cdot Ta)/(Ncell \cdot (nf \cdot k/q) \cdot \ln(1-J) + \beta) \quad (10)$$

That is, by solving the linear equation, it is possible to calculate the working temperature Tb from the working voltage Vpmax measured with the power conditioner and the open-circuit voltage at normal temperatures.

As described in detail above, in the failure diagnosis method of the present embodiment, by utilizing the method of calculating the solar radiation amount per unit area as solar radiation intensity, the method of calculating the working temperature and the array computation from the measured values with the power conditioner, it is possible to obtain the number of failed modules as failure information of modules existing in the solar battery array only from the values of the measured maximum working voltage Vpmax_b and the maximum working current Ipmax_b.

Figure 8A:
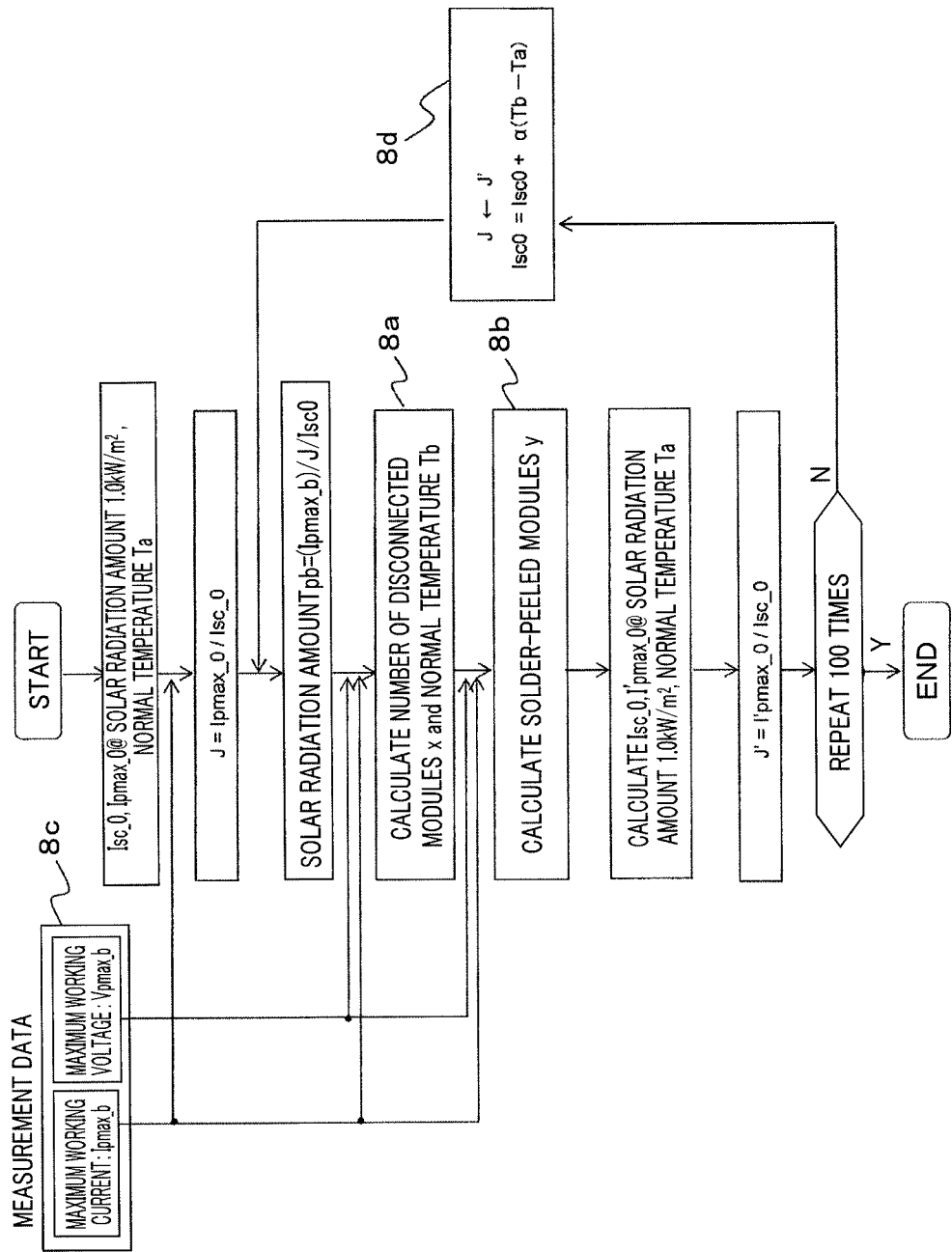
FIG. 8A is a flowchart showing an example of algorithm for calculating the number of failed solar battery modules in the solar battery array according to a first embodiment of the present invention.

FIG. 8A shows a flowchart of an example of the entire algorithm of the above-described calculation of the number of failed modules as failure information in the photovoltaic power generation system according to the present embodiment.

The calculation of the number of failed modules in the solar battery array begins with calculating the solar radiation amount pb from the value J (=ratio between the working current and the short-circuit current) obtained from the inspection specification, the short-circuit current Isc0 in the inspection specification, and the Ipmax_b in the measured data 8c measured with the power conditioner. Next, using the calculated solar radiation amount pb, the number of disconnection-occurred modules x and the working temperature Tb are obtained in a flow 8a. Further, the number of solder peeling occurred modules y is obtained using the calculated solar radiation amount pb, the working temperature Tb and the number of disconnected modules x, in a flow 8b.

The respective values of the calculated working temperature Tb, the temperature-characteristic corrected short-circuit current Isc0, and the value J (=ratio between the working current and the short-circuit current) changed by the occurrence of solder peeling, are updated with a flow 8d, and fed back to the stage before the calculation of the solar radiation amount pb. Then the solar radiation amount pb is calculated again from the measured maximum working current Ipmax_b. The calculation is repeated until the values of the working temperature Tb, the number of disconnected modules x, the number of solder-peeled modules y, and the ratio J between the working current and the short-circuit current are converged.

Figure 8B:
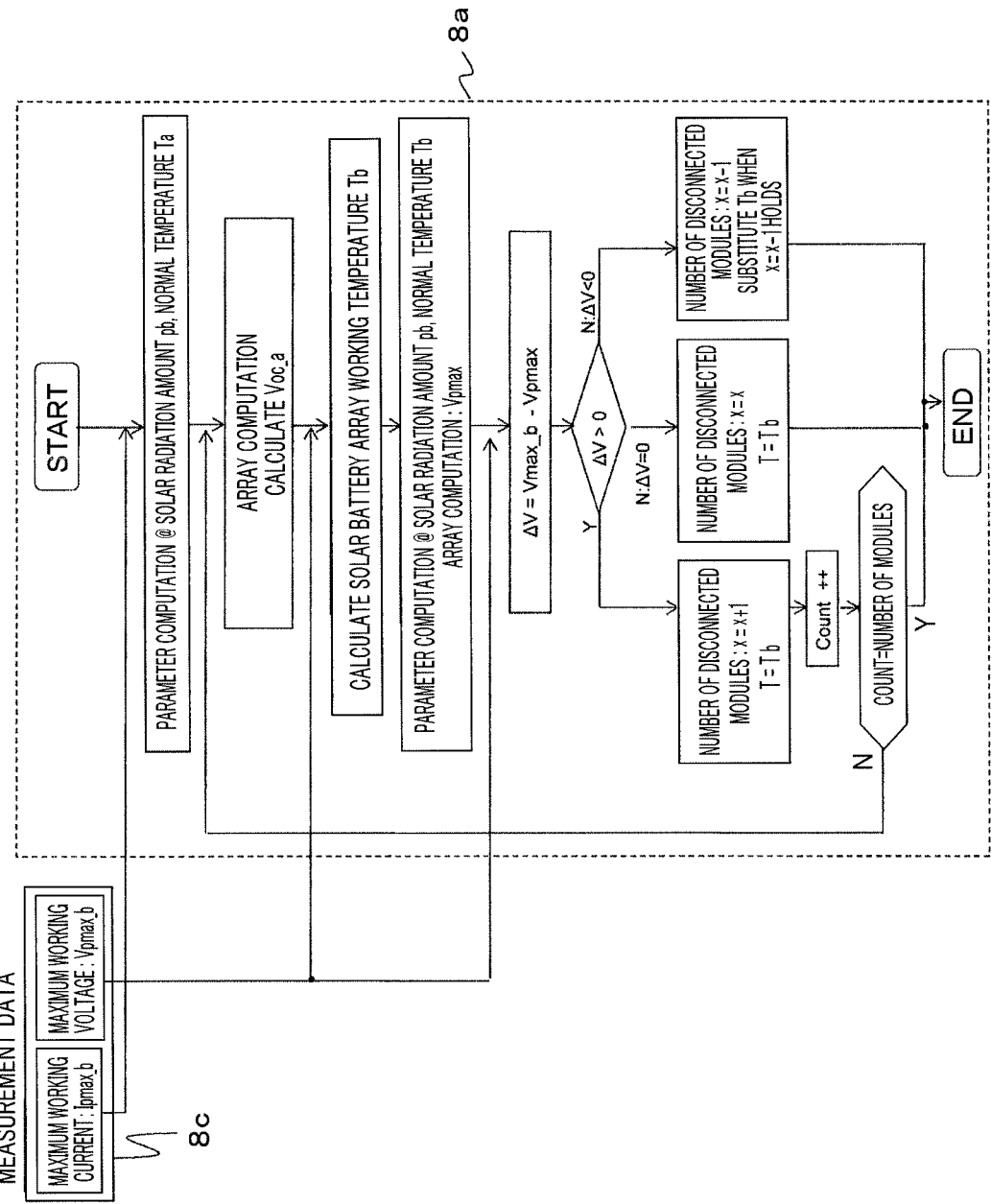
FIG. 8B is a flowchart showing the details of a primary part of the algorithm for calculating the number of failed solar battery modules in the solar battery array according to the first embodiment.

FIG. 8B shows the details of the example of calculation of the working temperature Tb and the number of disconnection-occurred modules x performed in the flow 8a of FIG. 8A. First, parameter computation is performed on the exposure condition using the calculated solar radiation amount pb and the normal temperature Ta. The parameter computation is obtaining the values of the respective factors of the expression (4) by solar battery module. Next, the array computation is performed to calculate the open-circuit voltage Voc_a using the solar radiation amount pb and the normal temperature Ta.

The working temperature Tb is calculated from the expression (9) using the open-circuit voltage Voc_a and the maximum working voltage Vpmax_b in the measured data 8c measured with the power conditioner. Then the array computation is performed on the condition of the solar radiation amount pb and the calculated normal temperature Tb to calculate the voltage Vpmax when the array electric power is maximum. The calculated Vpmax is compared with the maximum working voltage Vpmax_b. When the calculated value Vpmax_b is greater, the value x indicating the number of disconnected modules is incremented. When it is equal to the maximum working voltage Vpmax_b, the value x is not changed. When the value Vpmax_b is smaller, the value x is decremented and the array computation is performed again. In the array computation, the module to be disconnected is selected at random using Monte Carlo method or the like. The above-described operation is monitored with the Count, and the array computation and the setting of the number of disconnected modules are repeatedly performed until the Count is increased to the number of modules constituting the solar battery array. Regarding the Rs, wiring resistance [Ω] indicated with the expression (4), a value necessary for the operation of the bypass diode is set in the module to be disconnected.

Figure 8C:
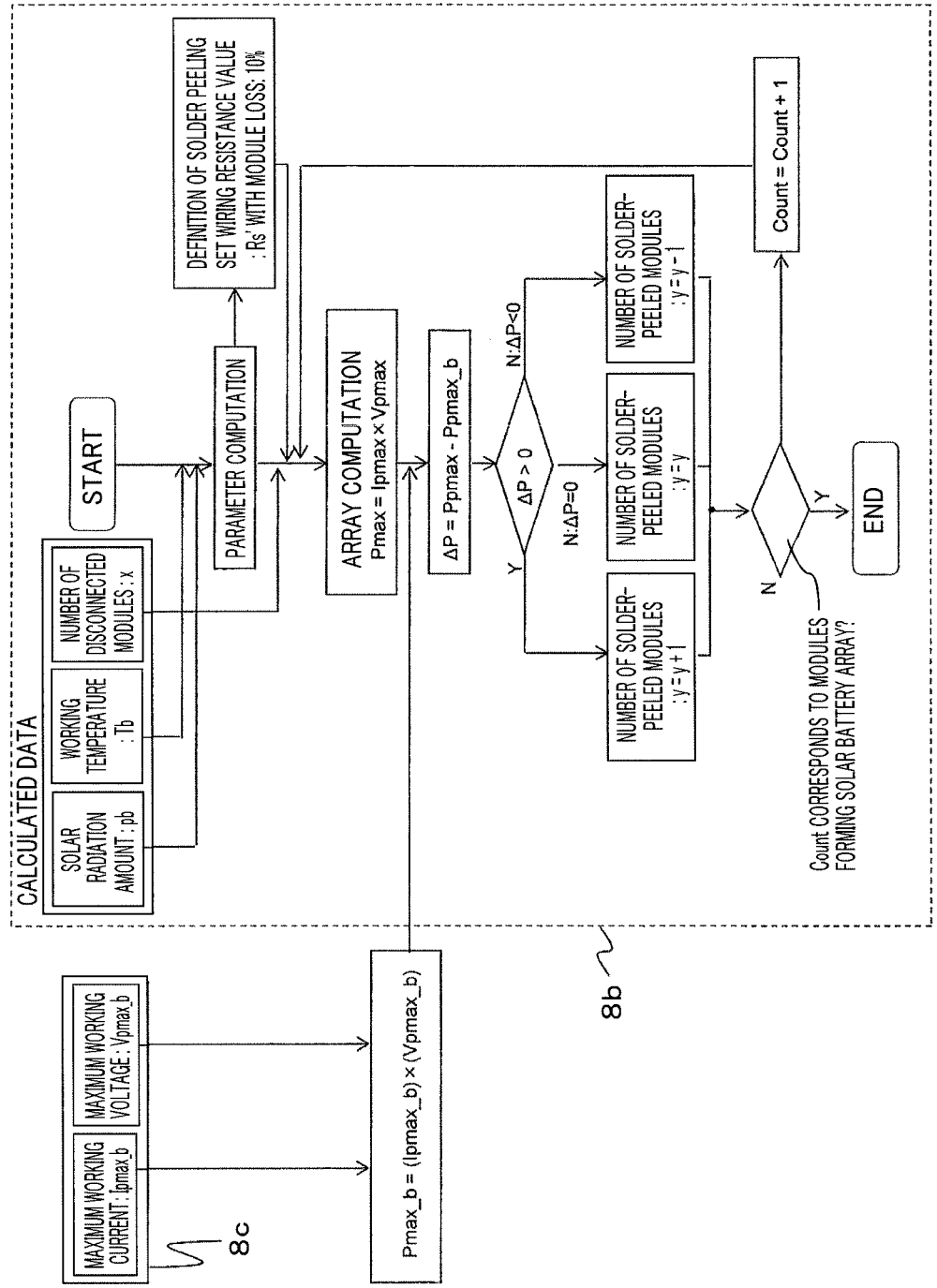
FIG. 8C is a flowchart showing the details of a primary part of the algorithm for calculating the number of failed solar battery modules in the solar battery array according to the first embodiment.

As a second stage, the calculation of the number of solder-peeled modules will be described using the flow in FIG. 8C. This flow shows the details of a part corresponding to the flow 8b of FIG. 8A. First, as in the case of FIG. 8B, the calculated solar radiation amount pb and the working temperature Tb are read, and the parameters on the exposure condition are calculated. Here, the wiring resistance value Rs' when the module power loss determined using the expression (4) is 10% is set. Next, the number of disconnected modules set in FIG. 8B is read, and the array computation is performed. The module to be disconnected is set in the flow 8a shown in FIG. 8B.

In the array computation, maximum working voltage Vpmax and the maximum working current Ipmax of the solar battery array including the disconnection information are calculated, and maximum power Pmax is calculated by multiplying these values. The calculated maximum power Pmax and the measured maximum power Pmax_b are compared with each other, and when the calculated value Pmax is greater, the value y indicating the number of modules having the wiring resistance Rs is incremented. When the measured value is the same as the maximum power Pmax, the value y is not changed. When the maximum power Pmax is smaller, the value y is decremented, and the array computation is performed again. In the array computation, the module in which the wiring resistance Rs' is set is selected at random using Monte Carlo method or the like. The above-described operation is monitored with the Count, and the array computation is repeatedly performed until the Count is increased to the number of modules constituting the solar battery array.

From the processing flow described in detail above, in the photovoltaic power generation system of the present embodiment, it is possible to grasp the number of failed solar battery modules existing in the solar battery array without adding a measuring unit and a communication unit by solar battery.

Further, in the photovoltaic power generation system of the present embodiment, the present flow is applied in a state where all the selection switches 11c in FIG. 3B are ON, and when it is determined that the number of failed modules is large, it is possible to realize monitoring of the number of failed modules by solar battery array 1a with the selection switch 11c. Further, regarding the solar battery array 1a in which it is determined that the number of failed modules is large, it is possible to perform failure inspection by solar battery string by sequentially changing the selection switch 12b.

Second Embodiment

Figure 9A:
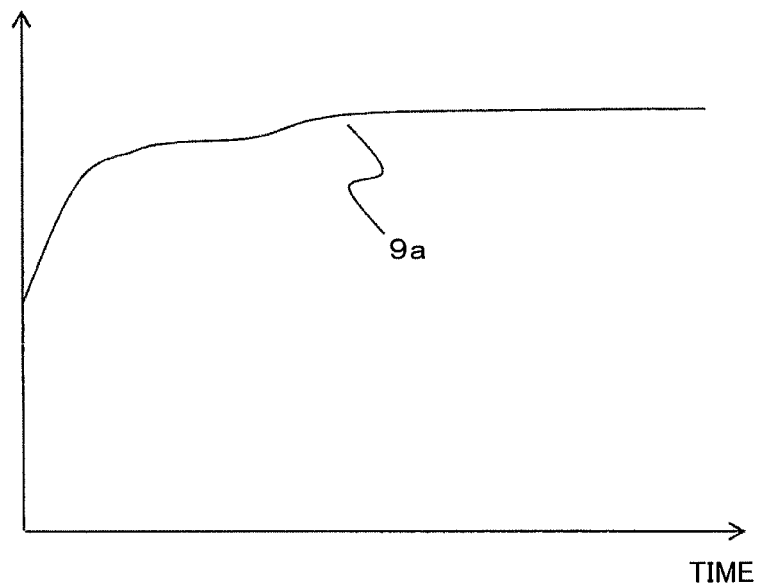
FIG. 9A is a graph showing the influence of light irradiation effect on the solar battery module according to a second embodiment of the present invention.
Figure 9B:
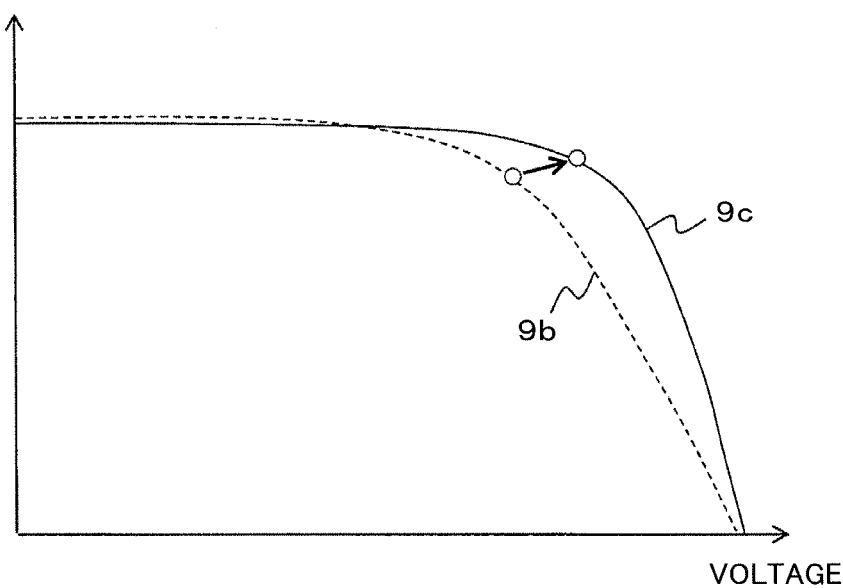
FIG. 9B is a graph showing the influence of light irradiation effect on the solar battery module according to the second embodiment.

Next, as a second embodiment of the failure diagnosis method for a photovoltaic power generation system, an embodiment where the solar battery module 111a has a light irradiation effect will be described. As shown in FIG. 9A, regarding a chemical compound solar battery represented by a CIS (Cu, In and Se) solar battery, as a known phenomenon, when it is exposed to solar radiation, the electric power is gradually increased from the shipment, to fixed electric power after the lapse of about 10 days. In this case, as shown in FIG. 9B, the characteristic of the solar battery module changes from a characteristic 9b to 9c. Since the short-circuit current and the maximum working current at that time are different from the short-circuit current and the maximum working current in a standard state described in the data upon shipment (solar radiation amount 1.0 kW/m², 25° C.), the value of the ratio between the working current and the short-circuit current J changes in the characteristics 9b and 9c. That is, when there is a light irradiation effect, it is necessary to change the value J (=ratio between the working current and the short-circuit current) to the ratio J between the working current and the short-circuit current in a state where the electric power is the fixed power. Further, as the large-scale photovoltaic power generation system has started operation in this state, it is necessary to perform the conversion of the ratio between the working current and the short-circuit current J from the measured value with the power conditioner.

Figure 10:
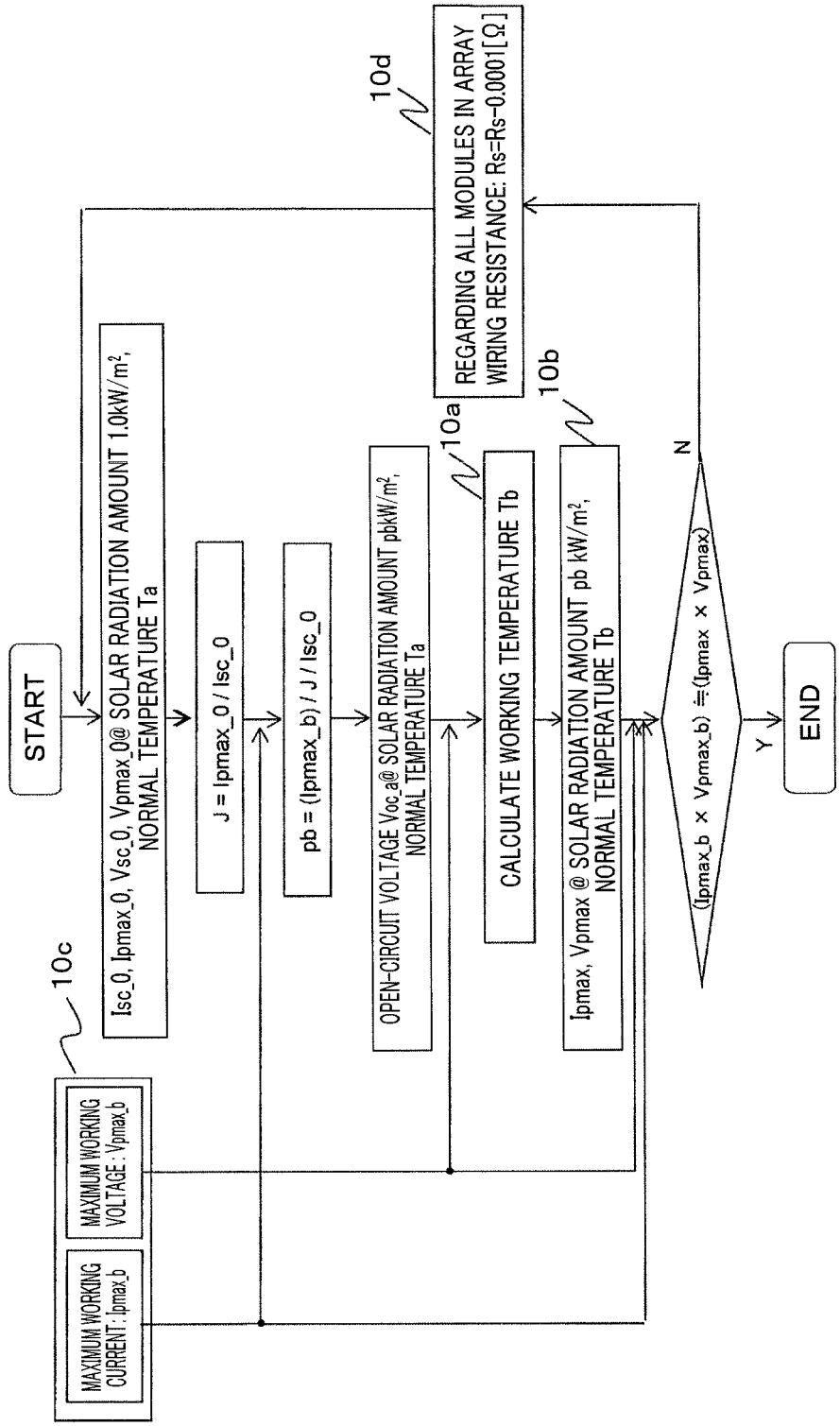
FIG. 10 is a flowchart showing a determination algorithm according to the second embodiment.

FIG. 10 shows the progress of the above conversion. First, the value J is obtained from the inspection specification, and the solar radiation amount pb is calculated from the short-circuit current Isc0 in the inspection specification and the maximum working current Ipmax_b of the measured data 10c measured with the power conditioner. Next, the open-circuit voltage Voc_a at normal temperature with the calculated solar radiation amount pb upon the calculation is calculated using an expression (11) modified from the expression (4).

$$Voc\_a = Ncell \cdot (nf \cdot k \cdot Ta)/q \cdot \ln\{(Isc\_0 \cdot pb)/Is\} \qquad (11)$$

When the open-circuit voltage Voc_a at normal temperature with the solar radiation amount pb is obtained, it is substituted in the expression (10) using the maximum working voltage Vpmax_b in the measured data 10c measured with the power conditioner, and the working temperature Tb is calculated in the flow 10a. As the calculated solar radiation amount pb and the working temperature Tb have been obtained, the maximum working current Ipmax and the maximum working voltage Vpmax of the solar battery array are calculated using the parameter computation and the array computation in the flow 10b.

The calculated maximum power Pmax(Ipmax×Vpmax) and the measured maximum power Pmax_b(Ipmax_b×Vpmax_b) are compared with each other. When the values are different, the wiring resistance Rs is decremented in all the solar battery modules, and the above-described calculation flow is performed again in the flow 10d. When the values are approximately the same, the calculation is terminated. That is, the predetermined coefficient J (=ratio between the working current and the short-circuit current) is updated by comparing the calculated value of the electric power calculated using the working temperature and the solar radiation intensity calculated while the wiring resistance value is decremented in all the solar battery modules with the measured value of the electric power detected with the voltage detection unit and the current detection unit.

According to the failure diagnosis method of the second embodiment, it is possible to realize failure diagnosis in consideration of the influence of light irradiation effect by performing the calculation flow shown in FIG. 8 with the wiring resistance Rs and the value J updated in the above progress.

Third Embodiment

Figure 11A:
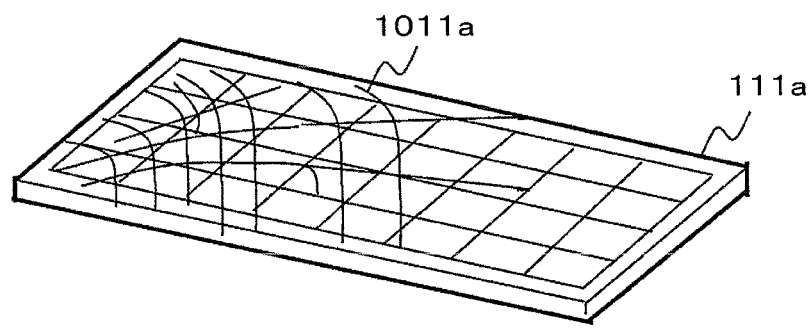
FIG. 11A is a perspective diagram showing the external appearance and characteristics of the solar battery module upon occurrence of glass breakage according to a third embodiment of the present invention.
Figure 11B:
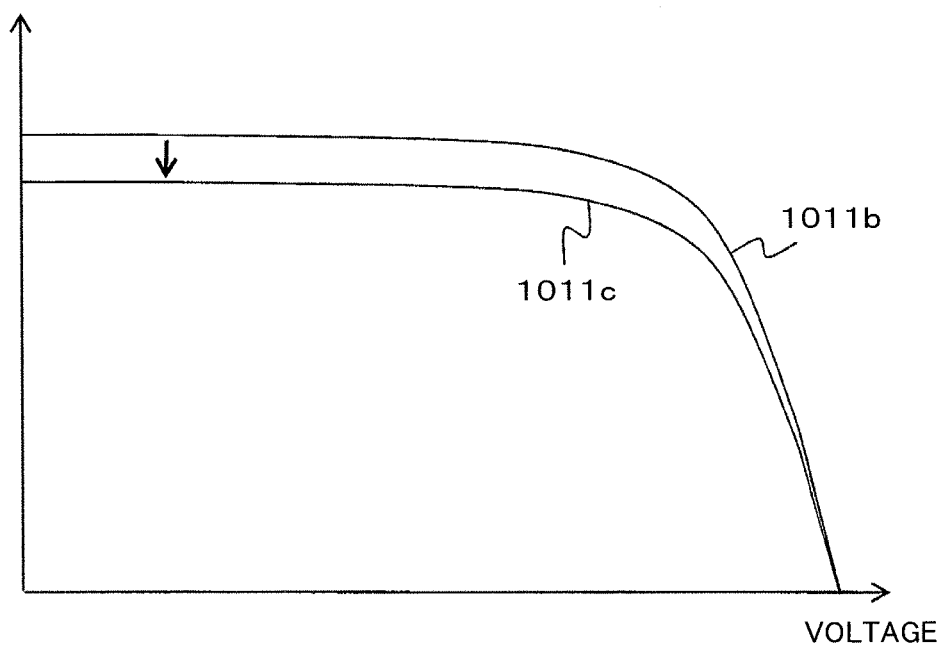
FIG. 11B is a graph showing the characteristics of the solar battery module upon occurrence of glass breakage, according to the third embodiment.

As a third embodiment, an embodiment of the failure diagnosis method when the short-circuit current of the solar battery module changes in the photovoltaic power generation system will be described. In a large-scale site such as a mega solar as shown in FIG. 1, in some cases, glass breakage 1011a as shown in FIG. 11A occurs when the system is struck by a falling stone dropped by a crow or the like. Upon occurrence of glass breakage, since the light transmittance to the solar battery module is lowered, the change from a characteristic 1011b to a characteristic 1011c as shown in FIG. 11B i.e. a characteristic of reduction of the short-circuit current is shown. In this case, the ratio between the working current and the short-circuit current J is maintained as a constant value.

Figure 12A:
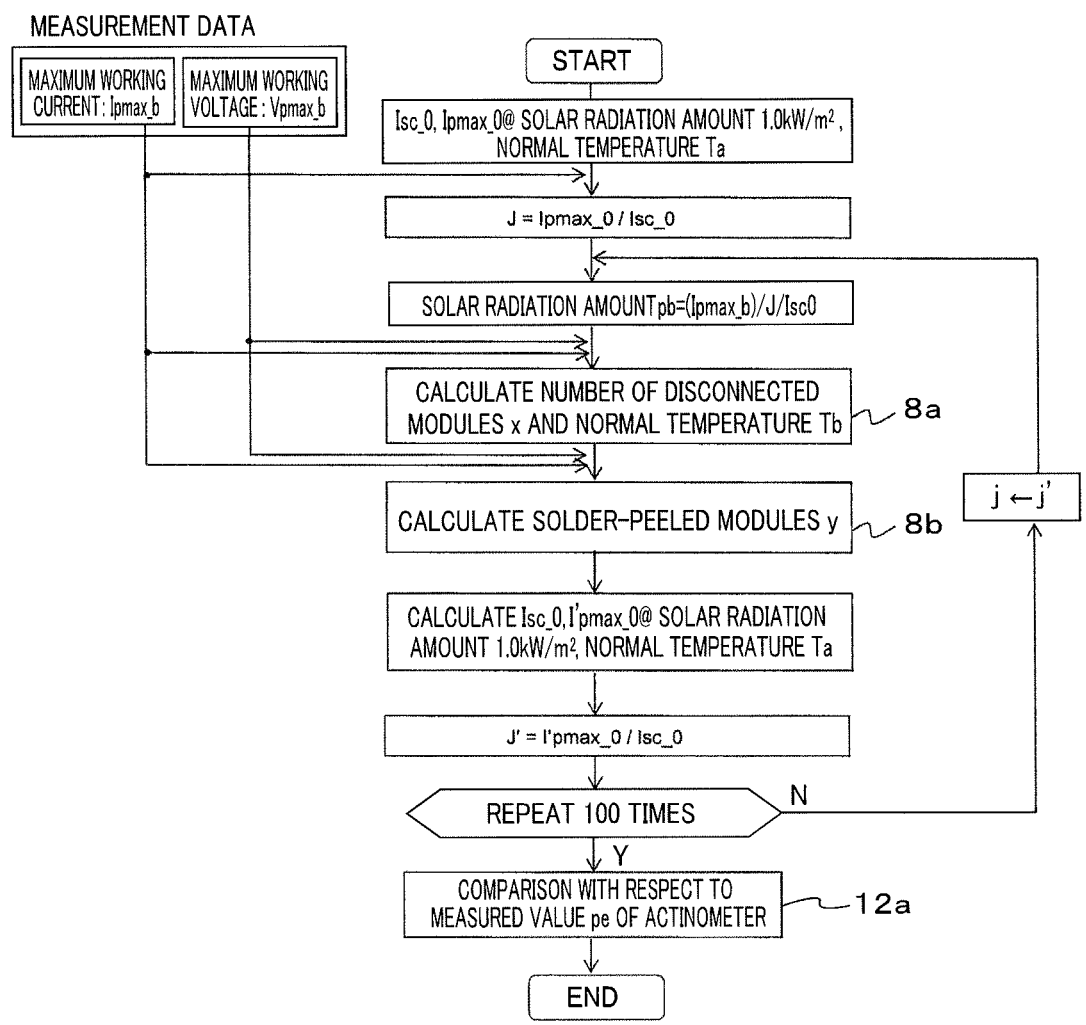
FIG. 12A is a flowchart showing an example of the determination algorithm according to the third embodiment.

According to the failure diagnosis method of the third embodiment, it is possible to realize the failure diagnosis upon change of short-circuit current as above in a flow shown in FIG. 12A. First, the repetitive processing to 100 times shown in FIG. 12A is the same as the processing shown in FIG. 8. It is possible to detect glass breakage by comparing the solar radiation amount pb calculated using the value J converged in the failure diagnosis flow shown in FIG. 8 with the measured value pe of the actinometer, in a flow 12a.

Figure 12B:
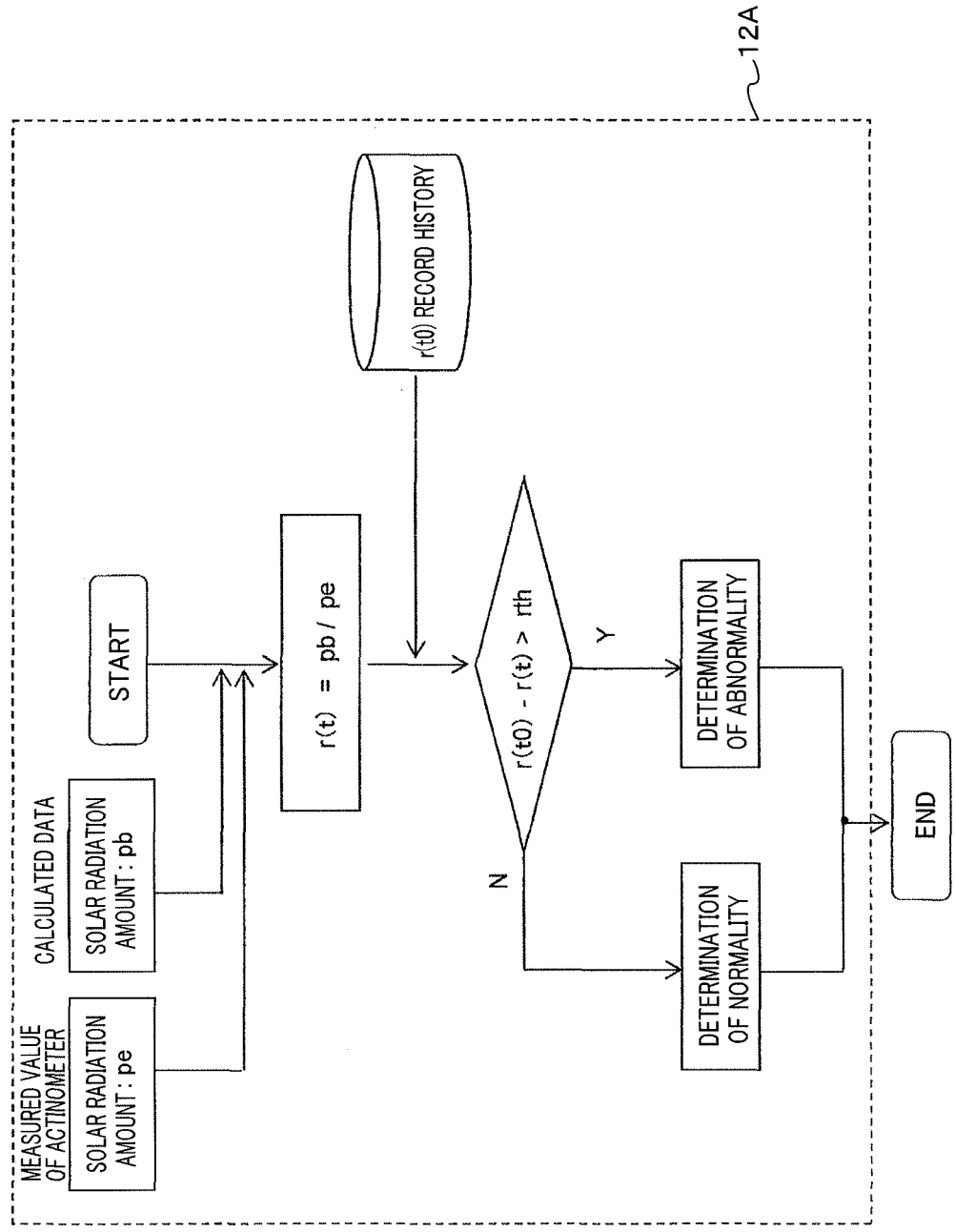
FIG. 12B is a flowchart showing the details of a primary part of the example of the determination algorithm according to the third embodiment.

FIG. 12B shows a particular example of comparison between the calculated solar radiation amount pb and the solar radiation amount pe as a reference measured value of the actinometer. First, a record history of a ratio r(t0) between the solar radiation amount pb calculated at some time t0 and the solar radiation amount pe as a measured value of the actinometer is stored, and a comparison is made with respect to a ratio r(t) calculated in real time monitoring. When the difference between the ratios r(t0) and r(t) exceeds a certain threshold value, it is determined that failure due to glass breakage occurs in many modules in the array and an investigation is conducted. In other words, in the present embodiment, the number of strings where the short-circuit current is lowered in the solar battery array is grasped by observing time change of the ratio between the calculated solar radiation intensity and the reference solar radiation intensity.

That is, when glass breakage occurs in one solar battery module constituting a string, the current power down influences the entire string. Accordingly, it is possible to determine the number of strings having glass-broken modules by defining the ratio of power-down current due to glass breakage and setting a predetermined threshold value to the same number as the number of strings.

Figure 12C:
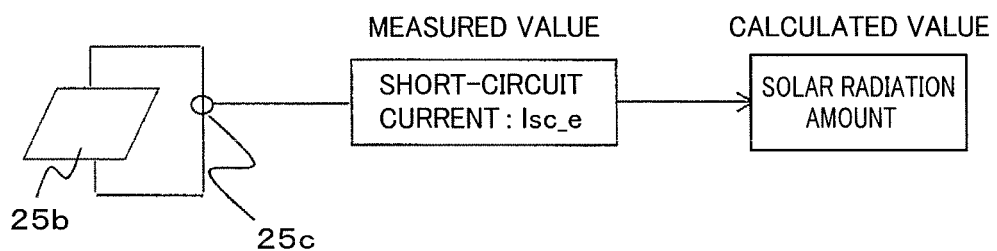
FIG. 12C is a block diagram explaining calculation of reference solar radiation amount from a short-circuit current in a reference solar battery module, according to the third embodiment.

Note that regarding the measurement value pe of the actinometer, it may be arranged such that, without an actinometer, and as shown in FIG. 12C, as the reference i.e. the short-circuit current upon occurrence of short-circuit in a reference solar battery module 25b, the solar radiation intensity as a reference i.e. the solar radiation amount pe per unit area is calculated from the short-circuit current Isc_e measured with a clamp ammeter 25c, and the calculated solar radiation amount pe is used. In this case, since it is unnecessary to use the actinometer, the response velocity of the solar battery module to solar radiation change is reflected. Accordingly, there is an advantage that the measurement accuracy upon solar radiation change is improved.

According to the above-described present invention, it is possible to realize low-cost failure diagnosis without addition of a measuring unit and a communication unit in a large-scale solar battery system, and provide very high availability.

Note that the present invention is not limited to the above-described embodiments, but includes various modifications. For example, the above-described embodiments have been described in detail so as to assist understanding of the present invention and the invention is not limited to embodiments having all the described constituent elements. Further, it is possible to replace a part of the constituent elements of an embodiment with those of another embodiment. Further, it is possible to add the constituent elements of an embodiment to those of another embodiment. Further, regarding a part of constituent elements of an embodiment, it is possible to perform addition, deletion, and/or replacement using other constituent elements.

Further, the above-described constituent elements, functions, processors and the like are realized as software by generating programs to realize some or all of them, however, some or all of them may be realized as hardware by designing them as e.g. an integrated circuit.

The present invention disclosed in the present specification discloses various inventions other than the invention in the claims. The examples of the claims are as follows.

CLAIM EXAMPLE 1

A failure diagnosis apparatus for a photovoltaic power generation system, comprising:

a detection unit that detects a working voltage and a working current of a solar battery array, formed by connecting in parallel a plurality of solar battery strings, each formed by serially connecting a plurality of modules, each formed by serially connecting a plurality of solar battery cells and connecting a protective diode to both ends, as one unit; and a failure information calculation unit that calculates failure information using the detected working voltage and the detected working current, wherein the failure information calculation unit calculates a solar radiation intensity of radiation on the solar battery array using a predetermined coefficient from the working current, calculates a working temperature of the solar battery array and failure information using the working voltage and the solar radiation intensity, and updates the predetermined coefficient using the working temperature and the failure information.

CLAIM EXAMPLE 2

A failure diagnosis apparatus for a photovoltaic power generation system, comprising:
a detection unit that detects a working voltage and a working current of a solar battery array, formed by connecting in parallel a plurality of solar battery strings, each formed by serially connecting a plurality of modules, each formed by serially connecting a plurality of solar battery cells and connecting a protective diode to both ends, as one unit; and
a failure information calculation unit that calculates failure information using the detected working voltage and the working current,
wherein the failure information calculation unit calculates a solar radiation intensity of radiation on the solar battery array using a predetermined coefficient from the working current,
calculates a working temperature of the solar battery array and failure information using the working voltage and the calculated solar radiation intensity, and
updates the predetermined coefficient by comparing a calculated value of electric power based on the working temperature and the solar radiation intensity calculated while a wiring resistance value is decremented in all the solar battery modules, with a measured value of electric power based on the working voltage and the working current.

What is claimed is:

1. A failure diagnosis method for a photovoltaic power generation system, the method comprising:
   detecting, by a detection unit, a working voltage and a working current of a solar battery array, formed by connecting in parallel a plurality of solar battery strings, each solar battery string formed by serially connecting a plurality of solar battery modules, each formed by serially connecting a plurality of solar battery cells and connecting a protective diode to both ends, as one unit;
   calculating, by a failure information calculation unit, failure information of the solar battery array using the detected working voltage and the working current;
   calculating, by the failure information calculation unit, a solar radiation intensity of radiation on the solar battery array using a predetermined coefficient, wherein the predetermined coefficient is a ratio between the working current and a short-circuit current of the solar battery array;
   calculating, by the failure information calculation unit, a working temperature of the solar battery array using the working voltage and the solar radiation intensity;
   updating, by the failure information calculation unit, the predetermined coefficient using the calculated working temperature and the failure information; and
   identifying, by the failure information calculation unit, failure in the solar battery array.

2. The failure diagnosis method for a photovoltaic power generation system according to claim 1, wherein the failure information is a number of failed solar battery modules.

3. The failure diagnosis method for a photovoltaic power generation system according to claim 1, further comprising calculating, by the failure information calculation unit, a number of failed solar battery modules, as the failure information, using a wiring resistance value corresponding to a loss amount of the solar battery modules, the detected working current, and the solar radiation intensity.

4. The failure diagnosis method for a photovoltaic power generation system according to claim 3, wherein the ratio of the predetermined coefficient is a ratio between the working current and the short-circuit current in a current-voltage characteristic of the solar battery array obtained by reflecting the wiring resistance value.

5. The failure diagnosis method for a photovoltaic power generation system according to claim 1, wherein the working temperature of the solar battery array is calculated using the detected working voltage, an open-circuit voltage of the solar battery array at normal temperature in the calculated solar radiation intensity, a temperature characteristic of the open-circuit voltage, and the predetermined coefficient.

6. A photovoltaic power generation monitoring system for transmitting a working voltage and a working current detected from a detection unit to a monitoring device using a signal conversion-transmission unit,
   wherein the monitoring device uses the failure diagnosis method according to claim 1.

7. The failure diagnosis method for a photovoltaic power generation system according to claim 1, further comprising calculating, by the failure information calculation unit, a number of solar battery strings in which the short-circuit current in the solar battery array is lowered based on time change of a ratio between the calculated solar radiation intensity and a reference solar radiation intensity.

8. The failure diagnosis method for a photovoltaic power generation system according to claim 7, wherein the reference solar radiation intensity is calculated from an occurrence of a short-circuit current in a reference solar battery module.

9. A failure diagnosis method for a photovoltaic power generation system, the the method comprising:
   detecting, by a detection unit, a working voltage and a working current of a solar battery array, formed by connecting in parallel a plurality of solar battery strings, each solar battery string formed by serially connecting a plurality of solar battery modules, each formed by serially connecting a plurality of solar battery cells and connecting a protective diode to both ends, as one unit;
   calculating, by a failure information calculation unit, failure information of the solar battery array using the detected working voltage and the working current;
   calculating, by the failure information calculation unit, a solar radiation intensity of radiation on the solar battery array using a predetermined coefficient, wherein the predetermined coefficient is a ratio between the working current and a short-circuit current of the solar battery array;
   calculating, by the failure information calculation unit, a working temperature of the solar battery array using the working voltage and the calculated solar radiation intensity;
   updating, by the failure information calculation unit, the predetermined coefficient by comparing a calculated value of electric power of the solar battery array based on the working temperature and the solar radiation intensity calculated while a wiring resistance value is decremented in the plurality of solar battery modules, with a measured value of electric power of the solar battery array based on the working voltage and the working current; and
   identifying, by the failure information calculation unit, failure in the solar battery array.

10. The failure diagnosis method for a photovoltaic power generation system according to claim 9, wherein the failure information is a number of failed solar battery modules.

11. The failure diagnosis method for a photovoltaic power generation system according to claim 9, further comprising calculating, by the failure information calculation unit, a number of failed solar battery modules, as the failure information, using a wiring resistance value corresponding to a loss amount of the solar battery modules, the detected working current, and the solar radiation intensity.

12. The failure diagnosis method for a photovoltaic power generation system according to claim 11, wherein the ratio of the predetermined coefficient is between the working current and the short-circuit current in a current-voltage characteristic of the solar battery array obtained by reflecting the wiring resistance value.

13. The failure diagnosis method for a photovoltaic power generation system according to claim 9, wherein the working temperature of the solar battery array is calculated using the detected working voltage, an open-circuit voltage of the solar battery array at normal temperature in the calculated solar radiation intensity, a temperature characteristic of the open-circuit voltage, and the predetermined coefficient.

14. A photovoltaic power generation monitoring system for transmitting a working voltage and a working current detected from a detection unit to a monitoring device using a signal conversion-transmission unit,
wherein the monitoring device uses the failure diagnosis method according to claim 9.

15. The failure diagnosis method for a photovoltaic power generation system according to claim 9, further comprising calculating, by the failure information calculation unit, a number of solar battery strings in which the short-circuit current in the solar battery array is lowered based on time change of a ratio between the calculated solar radiation intensity and a reference solar radiation intensity.

* * * * *